United States Patent [19]

Shioya et al.

[11] Patent Number: 4,732,613

[45] Date of Patent: * Mar. 22, 1988

[54] RECORDING LIQUID

[75] Inventors: Makoto Shioya, Tokyo; Tsuyoshi Eida; Masatsune Kobayashi, both of Yokohama, all of Japan

[73] Assignee: Canon Kabushiki Kaisha, Tokyo, Japan

[*] Notice: The portion of the term of this patent subsequent to Jun. 30, 2004 has been disclaimed.

[21] Appl. No.: 795,417

[22] Filed: Nov. 6, 1985

[30] Foreign Application Priority Data

Nov. 8, 1984 [JP] Japan ................................ 59-234205
Nov. 8, 1984 [JP] Japan ................................ 59-234206

[51] Int. Cl.$^4$ ...................... C09D 11/00; G01D 9/00; G01D 15/18
[52] U.S. Cl. ........................................ 106/20; 106/22; 346/101
[58] Field of Search ..................... 106/20, 22; 346/101

[56] References Cited

U.S. PATENT DOCUMENTS

| | | | |
|---|---|---|---|
| 2,482,765 | 9/1949 | Haagensen et al. | 127/46 |
| 4,260,827 | 4/1981 | Klinkmann et al. | 568/414 |
| 4,285,727 | 8/1981 | Uehara et al. | 106/22 |
| 4,419,388 | 12/1983 | Sugiyama et al. | 101/126 |
| 4,445,124 | 4/1984 | Fujii | 365/75 |
| 4,683,002 | 7/1987 | Minua et al. | 106/20 |

*Primary Examiner*—Josephine Barr
*Attorney, Agent, or Firm*—Fitzpatrick, Cella, Harper & Scinto

[57] ABSTRACT

A liquid composition is provided which contains a water-soluble dye and a solvent, and the liquid composition has a total concentration of divalent and higher valent metals at 20 ppm or less, and a magnesium concentration is preferably 4 ppm or less. An ink-jet recording method employing the ink comprising the above-mentioned liquid composition is also provided.

24 Claims, No Drawings

RECORDING LIQUID

BACKGROUND OF THE INVENTION

1. Field of the Invention

The present invention relates to a recording liquid a (hereinafter referred to as ink) for performing record on recording media such as paper, plastic films, and the like by using an ink-jet recording system or a writing tool such as a fountain pen, felt pen, or the like.

2. Description of the Prior Art

The ink-jet recording system comprises forming ink droplets by any of various ink-discharging techniques and causing a portion or all of the droplets to deposit on a recording medium such as paper or the like to record an image thereon. Inks known and used for ink-jet recording systems are solutions or dispersions of various water-soluble dyes or pigments in liquid mediums such as water and mixtures thereof with water-soluble organic solvents.

Similar inks are also in use for recording with writing tools such as fountain pens, felt pens, and ball pens.

A variety of performance characteristics are naturally required for these inks. The most greatly required characteristic, is liquid stability so as not to form any precipitate that may clog a nozzle or an orifice of an ink-jet recorder or may deposit on a pen point during recording or at an intermission thereof for a short or long period. This characteristic is especially important to an ink-jet recording system wherein thermal energy is employed for discharging ink, since the temperature change therein tends to cause deposition of foreign matter on the surface of the heating heads However, inks of prior art: need incorporation of some additives in order to satisfy various requirements on the discharge characteristics, long-term storage stability, surface tension, and electrical properties of the ink, the distinctness and optical density of recorced images, etc. Moreover various impurities are contained in dyes used in prior art inks. Accordingly, these inks involve a number of difficulties such as clogging at nozzles or orifices of ink-jet recorders, deposit formation on the surface of the heating heads, and emergence of precipitates during prolonged storage of the inks. This is one of the reasons why inkjet recording systems has not come into wide use even with their many superior characteristics.

SUMMARY OF THE INVENTION

The primary object of the invention is to provide an ink which will overcome the above noted shortcomings of inks of prior arts and which, even at a high concentration, will exhibit such superior stability during service and long-term storage as not to cause clogging of nozzles or orifices and not to form any deposit on heating heads of ink-jet recorders which are actuated by thermal energy.

According to one aspect of the invention, there is provided a liquid composition containing a water-soluble dye and a solvent, wherein said liquid composition has a total concentration of divalent and higher valent metals at 20 ppm or less.

According to another aspect of the invention, there is provided a liquid composition containing a water-soluble dye and a solvent, wherein said liquid composition has a magnesium concentration of 4 ppm or less.

According to a further aspect of the invention, there is provided an ink-jet recording method comprising forming droplets of ink to perform recording, the ink comprising a liquid composition containing a water-soluble dye and a solvent, wherein said liquid composition has a total concentration of divalent and higher valent metals at 20 ppm or less.

According to a still further aspect of the invention, there is provided an ink-jet recording method comprising forming droplets of ink to perform recording, the ink comprising a liquid composition containing a water-soluble dye and a solvent, wherein said liquid composition has a total concentration of divalent and higher valent metals at 20 ppm or less.

DETAILED DESCRIPTION OF THE PREFERRED EMBODIMENTS

As a result of intensive studies to achieve the above and other objects, it was discovered that the foregoing problems arise mainly from various impurities (organic compounds and inorganic compounds, e.g. surfactants and leveling agents) contained in the commercial dye used in the ink. Further it was found that divalent and higher valent metal ions or compounds, particularly magnesium ion, of the above impurities contained in inks are most responsible for clogging of nozzles or orifices, formation of precipitates during storage of inks, and in particular the deposition of foreign matter on heating heads in ink-jet recording systems utilizing thermal energy. The present invention is based on the above finding.

Hereinafter the invention is described in more detail.

The fundamental components per se constituting ink of the invention are already known. One of these components is a water-soluble dye, typical examples of which are direct dyes, acid dyes, basic dyes, and reactive dyes. Dyes specially suitable as components of the inks for ink-jet recording and satisfactory in brightness, water-solubility, stability, light resistance, and other required properties are, for example, C.I. Direct Black 17, 19, 32, 51, 71, 108, and 146; C.I. Direct Blue 6, 22, 25, 71, 86, 90, 106, and 199; C.I. Direct Red 1, 4, 17, 28, and 83; C.I. Direct Yellow 12, 24, 26, and 98; C.I. Direct Orange 34, 39, 44, 46, and 60; C.I. Direct Violet 47 and 48; C.I. Direct Brown 109; C.I. Direct Green 59; C.I. Acid Black 2, 7, 24, 26, 31, 52, 63, 112, and 118; C.I. Acid Blue 9, 22, 40, 59, 93,102, 104, 113, 117, 120, 167, 229, and 234; C.I. Acid Red 1, 6, 32, 35, 37, 51, 52, 80, 85, 87, 92, 94, 115, 180, 256, 317, and 315; C.I. Acid Yellow 11, 17, 23, 25, 29, 42, 61, and 71; C.I. Acid Orange 7 and 19; C.I. Acid Violet 49; C.I. Basic Black 2; C.I. Basic Blue 1, 3, 5, 7, 9, 24, 25, 26, 28 and 29; C.I. Basic Red 1, 2, 9, 12, 13, 14, and 37; C.I. Basic Violet 7, 14, and 27; and C.I. Food Black 2. These examples are particulary preferred dyes in the present invention but do not restrict it.

Such water-soluble dyes are used generally at a concentration of about 0.1 to 20% by weight in inks of prior art. In the present invention, these dyes can be used, on the basis of discovery of the invention, not only in the above concentration range but also in higher concentrations, the ink of the invention even at a high dye concentration is superior in liquid stability to inks of prior arts and forms no precipitate.

The liquid medium used in the ink of the present invention is water or preferably a mixture of water with a water-soluble organic solvent such as a polyhydric alcohol having the effect of retarding the drying of inks. Desirably, water used herein is not common water containing various ions but deionized water. Suitable watersoluble organic solvents for use in mixture with water are; $C_1$–$C_4$ alkyl alcohols, e.g. methanol, ethanol, n-propanol, isopropanol, n-butanol, secbutanol, tert-butanol, and isobutanol; amides, e.g. dimethylformamide and dimethylacetamide; ketones or keto-alcohols, e.g. acetone and diacetone alcohol; ethers, e.g. tetrahydrofuran and dioxane; polyalkylene glycols, e.g. polyethylene glycol and polypropylene glycol; alkylene glycols having 2–6 carbon atoms in the alkylene group, e.g. ethylene glycol, propylene glycol, butylene glycol, triethylene glycol, 1,2,6-hexanetriol, thiodiglycol, hexylene glycol, and diethylene glycol; glycerol; lower alkyl ethers of polyhydric alcohols, e.g. ethylene glycol methyl (or ethyl) ether, diethylene glycol methyl (ethyl) ether and triethylene glycol monomethyl (or monoethyl) ether; N-methyl-2-pyrrolidone; and 1,3-dimethyl-2-imidazolidinone. Of these various alcohols, preferred are polyhydric alcohols such as diethylene glycol and lower alkyl ethers of polyhydric alcohols such as triethylene glycol monomethyl (or monoethyl) ether.

The content of the water-soluble organic solvent in the ink is in a range of generally 0 to 95%, preferably 10 to 80%, particularly preferably 20 to 50%, by weight based on the whole weight of the ink.

The water content in the ink is chosen from a wide range, depending on the nature and composition of the ink medium and desired properties of the ink, but is generally 10 to 100%, preferably 10 to 70%, particularly preferably 20 to 70%, by weight based on the whole weight of the ink.

The ink of the present invention, having fundamental components as described above, is characterized primarily in that the total content of divalent and higher valent metals therein is 20 ppm or less.

According to the present invention, the stability of ink compositions, dyes used in inks of prior arts, being produced originally for the purpose of fiber dyeing, contain additives, e.g. surfactants and leveling agents, and further diversified impurities such as sodium chloride, sodium sulfate, and salts of alkaline earth metals, and such impurities are known to cause various difficulties in ink-jet recording and writing with a pen or the like. Ink compositions were prepared from dyes highly purified by removing the impurities. These ink compositions, although reducing significantly the above difficulties, were not satisfactory enough in preventing the deposition of foreign matters on the heating heads in ink-jet recording systems, particularly those actuated by thermal energy. The present inventors further discovered that commercial dyes contain considerable amounts (tens to hundreds of ppm) of divalent and higher valent metal ions (e.g. calcium, magnesium, manganese, iron, aluminum, and silicon metal ions) or compounds thereof (e.g. colloidal oxides and hydroxide), and that these substances, magnesium in particular, are the primary cause for formation of deposits on the surface of the heating heads and affect most strongly the formation of foreign matter. This finding has led to the present invention.

The total content of the above bothering substances in the ink is controlled by the following procedure.

First a dye is precipitated from its aqueous solution at a desired concentration by adding sodium sulfate. The precipitate is filtered, washed with a saturated aqueous sodium sulfate solution, and dried. A prescribed amount of the dried dye solid is dissolved in a water-soluble organic solvent, and the solution is filtered. Any water-soluble organic solvent may be used herein, as long as it is a poor solvent for sodium sulfate and a good one for the dye. An optimum solvent depending on the structure of the dye can be freely chosen arbitrarily. Usually alcohols, glycols, and glycol ethers, as mentioned before, are favorable. The obtained filtrate may be filtered again after standing for 1 to 3 days.

Subsequently the filtrate, combined with a prescribed amount of water, is stirred and then passed through a layer of a cation exchange resin. An additive is incorporated, as required, into the effluent with stirring to prepare an ink. The contents of divalent and higher valent metals in the ink is determined by atomic absorption spectrophotometry or the induction plasma emission spectral analysis to ascertain the total contents being not more than 20 ppm, and to put the ink into service.

The magnesium content in the ink may be adjusted as follows:

First a dye is percipitated from its aqueous solution of a desired concentration by adding sodium sulfate. Then the precipitate is filtered, washed with a saturated aqueous sodium sulfate solution, and dried. A prescribed amount of the dried dye is dissolved in a water-soluble organic solvent, and the solution is filtered. Also in this case, any water-soluble organic solvent may be used, as long as it is a poor solvent of sodium sulfate and a good solvent of the dye. An optimum solvent depending on the structure of the dye can be arbitrarily chosen. Usually alcohols, glycols, and glycol ethers, as mentioned before, are favorable.

Subsequently, the thus obtained filtrate, combined with a prescribed amount of water, is stirred and then passed through a layer of a cation exchange resin. The effluent, after proper pH adjustment, is left standing for 7 to 10 days and filtered. Then an additive is added, if necessary, to the filtrate with stirring to prepare an ink. The ink is put into service after the content of magnesium therein has been ascertained by atomic absorption spectrophotometry or the induction plasma emission spectral analysis to be not more than 4 ppm.

In the treatment procedure described above; the first salting-out treatment is intended primarily to remove sodium chloride which is a representative impurity contained in large amounts in usual commercial dyes; the second treatment with a water-soluble organic solvent is intended primarily to remove both of sodium sulfate originally contained as an impurity in the dye and added in a large amount in the preceding salting-out treatment; the long standing of the filtrate after filtration of the dye dissolved in the organic solvent and the long standing of the liquid treated with a cation exchange resin in the case of the magnesium content control, both followed by filtration are intended primarily to remove the colloidal substances containing divalent and higher valent metals and to remove colloidal magnesium, respectively; and the treatment with a cation exchange resin is intended to remove divalent and higher valent metal ions, particularly magnesium ions.

A method for controlling the content of divalent and higher valent metals or the content of magnesium, in the ink, has been described above. The controlling method, however, is not limited to the above, and any other method may be employed which permits removing said ions or colloidal compounds of divalent and higher valent metals, particularly ions or colloidal compounds of magnesium. Such other methods include, for example, aeration, sedimentation by use of a flocculant, filtration, lime softening, and electrolysis.

Besides the impurities contained in the dyes, those contained in the water are considered as sources of the contamination of inks with ions or compounds of divalent and higher valent metals, particularly ions or compounds of magnesium. This contamination can be avoided by using distilled water, deionized water, or both of them. The greatest source of ink contamination with divalent and higher valent metals, particularly magnesium are impurities contained in the dyes to be used. In particular when the used dyes are unpurified commercial products, markedly large amounts of such metals are often contained in the inks. For instance, analysis showed as high as several thousand ppm of these impurities contained in a certain dye powder.

While the above description has been given chiefly on the removal of divalent and higher valent metals, particularly magnesium, contained in inks, it is desirable in practice to remove them simultaneously with various other inorganic salts such as sodium chloride and sodium sulfate.

Besides the basic components described above, the ink of the present invention is allowed to contain various known additives, if necessary, such as a dispersant, surfactant (cationic, anionic, or nonionic), viscosity modifier (e.g. polyvinyl alcohol, cellulosic compound, or some other water-soluble resin), surface tension modifier (e.g. diethanolamine or triethanol amine), pH conditioner (e.g. a buffer solution), and antimold agent.

An inorganic salt such as lithium chloride, ammonium chloride, or sodium chloride is added as a resistivity modifier to inks which will be used in a type of ink-jet recording system wherein electric charge is given to the inks for the ejection thereof. For use in a type of ink-jet recording system wherein inks are ejected by the action of thermal energy, thermal properties (e.g. specific heat, coefficient of thermal expansion, and heat conductivity) of the inks are conditioned occasionally.

The ink of the present invention, prepared as described above, is sufficient for solving the problems of the prior art and is excellent and balanced as such in recording characteristics (signal responsiveness, stability of droplet formation, discharge stability, workability in continuous recording for many hours, and discharge stability after a long intermission), storage stability, fixability on recording media, light and weathering resistance of resulting recorded images, and so forth. Thus, the present ink is useful for various types of ink-jet recording systems and for writing tools, particularly for the ink-jet recording systems utilizing thermal energy, wherein the formation of deposits from inks is a most undesirable matter.

The present invention is illustrated in more detail with reference to the following examples. In these examples, parts and % are all by weight.

EXAMPLE 1a

Preparation of ink

Sodium sulfate was added to a saturated aqueous solution of a commercial dye (Direct Fast Yellow R supplied by Sumitomo Chemical Co., Ltd.) with stirring to precipitate the dye. This precipitate was filtered, washed with a saturated solution of sodium sulfate in pure water, and dried. This dried solid was weighed out in such a prescribed amount that the dye concentration in the intended ink would be 3%, and was dissolved in a mixture of ethylene glycol and N-methyl-2-pyrrolidone (3:1). This aqueous solution was filtered under pressure through a Teflon filter having an average pore diameter of 1 $\mu$m. The filtrate was weighed in a plastic container, allowed to stand in a cold dark room for 3 days, and filtered again through a Teflon filter (avarage pore diameter 1 $\mu$m). Then 60 parts of water was added to 40 parts of the filtrate with stirring to give an ink. This ink was passed through a layer of a cation exchange resin C464 (supplied by Sumitomo Chemical Co., Ltd.). The effluent was adjusted to pH 9.8 with an 0.1 N aqueous NaOH, and measured for the total content of divalent and higher valent metals by induction plasma emission spectral analysis. The found content was 20 ppm. The following characteristics $T_1$–$T_5$ of the thus obtained ink were examined by using (for $T_2$–$T_5$) a recorder provided with on-demand type multiheads (discharge orifice diameter 35 $\mu$m, resistance of heat-generating resistor 150 ohm, driving voltage 30 V, frequency 2 KHz) which perform recording with ink droplets discharged by applying thermal energy to the inks fed therein. The ink was found good in all the characteristics $T_1$–$T_5$.

($T_1$) Long-term stability: Samples of the ink, sealed in plastic bags, were stored for 6 months at temperatures of $-30°$ C. and $60°$ C. In both the cases, neither insoluble matter nor change in physical properties including color was observed.

($T_2$) Discharge stability: The discharge was conducted continuously for 24 hours in atmospheres of room temperature, $5°$ C., and $40°$ C. Under all the conditions, high quality recording could be continued steadily throughout the operation.

($T_3$) Discharge responsiveness: The discharge was conducted at intervals of 2 sec and also conducted after 2 months' standing of a sample of the ink. In both the cases, none of the orifices were clogged and images were recorded uniformely and steadily.

($T_4$) Quality of recorded image: Images recorded on recording media shown later in Table 1 were high in optical density and distinctness, and percentages of decrease in the optical density were up to 1% after 6 months' exposure of the images to indoor light.

($T_5$) Fixability on various recording media:

An image was recorded on each of recording media shown later in Table 1a, and 15 sec later, was rubbed with a finger, and the aberration and blotting of the image were checked. On any of the recording media, neither the aberration nor the blotting was observed. Thus the ink showed superior fixability.

EXAMPLES 2a–5a

In the same manner as in Example 1a, inks were prepared from commercial dyes shown later in Table 2a, and were tested for the characteristics $T_1$–$T_5$. All the inks gave superior results similarly to Example 1a.

EXAMPLE 6a

Inks of Examples 2a, 3a, 4a, and 5a were tested as yellow, magenta, cyan, and black inks, respectively, for the characteristics $T_1$–$T_5$ in the same manner as in Example 1a except that recording was conducted by using a recorder having an on-demand type head (discharge orifice diameter 50 $\mu$m, driving voltage for piezoelectric oscillators 60 V, frequency 4 KHz) which discharges ink droplets by means of piezoelectric oscillators to perform recording. All these inks gave superior results.

EXAMPLE 7a

Copies of a full-color photograph were made by using inks of Examples 2a, 3a, 4a, and 5a as yellow, magenta, cyan, and black inks, respectively and by means of the ink-jet recorder used in Examples 2a–5a. The obtained image was bright in each color and good in color reproduction.

EXAMPLE 8a

Felt pens were filled respectively with different-color inks prepared in Examples 2a–5a, and were allowed to stand for 10 days with the caps removed. With these pens, writing could be carried out smoothly without being blurred.

COMPARATIVE EXAMPLE A

Sodium sulfate was added to a saturated aqueous solution of the same dye (Direct Fast Yellow R) as used in Example 1a, with stirring to precipitate the dye. This precipitate was filtered, washed with a saturated solution of sodium sulfate in pure water, and dried. The dried solid was weighed out in such a prescribed amount that the dye concentration in the intended ink would be 3%, and was dissolved in a mixture of ethylene glycol and N-methyl-2-pyrrolidone (3:1). This solution was filtered under pressure through a Teflon filter (average pore diameter 1 $\mu$m). Then 60% of water was added to 40% of the filtrate to prepare the intended ink.

The content of divalent and higher valent metals in this ink was 30 ppm as measured by atomic absorption spectrophotometry. The characteristics $T_1$–$T_5$ of this ink were examined in the same manner as in Example 1a. As to $T_1$, insoluble matter appeared in the ink after one month's storage thereof. As to $T_2$, the ink discharge stopped frequently, hence requiring a change (increase) in the driving voltage. On microscopic observation of the surface of a heating head, a brown deposit was seen adhering thereto. As to $T_3$, the ink left standing for one month caused orifice clogging and the discharge of the ink was found unstable.

Further, two inks were prepared from the above original dye by following the treatment procedure of Example 1a except that the standing treatment was neglected for one of the inks and the cation exchange treatment for the other ink. The total content of divalent and higher valent metals was found to be 23 ppm in the former ink and 25 ppm in the latter ink. Results of the same $T_1$–$T_5$ tests indicated that these inks were inferior in these performance characteristics to the ink of Example 1a, i.e. the ink prepared without neglecting any of the treatment steps of Example 1a.

EXAMPLE 1b

Preparation of ink

Sodium sulfate was added to a saturated aqueous solution of a commercial dye (Direct Fast Yellow R, supplied by Sumitomo Chemical Co., Ltd.) with stirring to precipitate the dye. This precipitate was filtered, washed with a saturated solution of sodium sulfate in pure water, and dried. The dried dyes was weighed out in such a prescribed amount that the dye concentration in the intended ink would be 3%, and was dissolved in a mixture of ethylene glycol and N-methyl-2-pyrrolidone (3:1). This aqueous solution was filtered under pressure through a Teflon filter (average pore diameter 1 $\mu$m), and 60 parts of water was added to 40 parts of the filtrate with stirring to give an ink. This ink was passed through a layer of cation exchange resin C-466 (supplied by Sumitomo Chemical Co., Ltd.). The effluent was adjusted to pH 9.8 with 0.1 N aqueous NaOH, allowed stand for 10 days in a plastic container, and filtered again under pressure through a Teflon filter (average pore diameter 1 $\mu$m), thus preparing an ink of the present invention.

The magnesium content in this ink was 3.8 ppm as measured by atomic absorption spectrophotometry.

This ink was tested for the characteristics $T_1$–$T_5$ in the same manner as in Example 1a, giving similarly good results. In the Tests of $T_4$ and $T_5$, recording was conducted on the same recording media as used in Example 1a which are shown in Table 1a.

EXAMPLES 2b–5b

In the same manner as in Example 1b, inks were prepared from commercial dyes shown later in Table 2b and and were tested for the characteristics $T_1$–$T_5$. All the inks gave superior results similarly to Example 1b.

EXAMPLE 6b

Inks of Examples 2b, 3b, 4b, and 5b were tested as yellow, magenta, cyan, and black inks, respectively, for the characteristics $T_1$–$T_5$ in the same manner as in Example 1b except that recording was conducted by using a recorder having an on-demand type head (discharge orifice diameter 50 $\mu$m, driving voltage for piezoelectric oscillators 60 V, frequency 4 KHz) which discharges ink droplets by means of piezo-electric oscillators to perform recording. All these inks gave superior results.

EXAMPLE 7b

Copies of a full-color photograph were made by using inks of Examples 2b, 3b, 4b, and 5b as yellow, magenta, cyan, and black inks, respectively, and by means of the ink-jet recorder used in Examples 2b–5b. The obtained image was blight in each color and good in color reproduction.

EXAMPLE 8b

Felt pens were filled respectively with different-color inks prepared in Examples 2b–5b, and allowed to stand for 10 days with the caps removed. With these pens, writing could be carried out smoothly without any ink-deficient character.

COMPARATIVE EXAMPLE B

Sodium sulfate was added to a saturated aqueous solution of the same dye (Direct Fast Yellow R) as used in Example 1b, with stirring to precipitate the dye. This precipitate was filtered, washed a saturated solution of sodium sulfate in pure water, and dried. The dried solid was weighed out in such a prescribed amount that the dye concentration in the intended ink would be 3%, and was dissolved in a mixture of ethylene glycol and N-methyl-2-pyrrolidone (3:1). This solution was filtered under pressure through a Teflon filter (average pore diameter 1 $\mu$m). Then, 60% of water was added to 40% of the filtrate to prepare the intended ink.

The magnesium content in the ink was 6.1 ppm as measured by atomic absorption spectrophotometry. The characteristics $T_1$–$T_5$ of this ink were examined in the same manner as in Example 1b.

As to $T_1$, insoluble matter appeared in the ink after one month's storage thereof. As to $T_2$, the ink discharge stopped frequently, hence requiring a change (increase) in the driving voltage. On microscopic observation of the surface of a heating head, a brown deposit was seen adhering thereto. As to $T_3$, the ink left standing for one month caused orifice clogging and the discharge of the ink was found unstable.

Further, two inks were prepared from the above original dye one by employing cation exchange treatnent and the othre by employing electrostatic treatment, respectively in addition to the above-mentioned treatment. The magnesium content was found to be 4.8 ppm in the former ink and 5.1 ppm in the latter ink. Results of the same tests for $T_1$–$T_5$ indicated that the perfomance characteristics of these inks were insufficient for the practical use, though found to be improved to a certain extent as compared with those of the ink subjected to none of the above additional treatment.

TABLE 1a

| Recording medium (tradename) | Nature of recording medium | Maker for recording medium |
| --- | --- | --- |
| Ginkan | High quality | Sanyo Kokusaku Pulp Co., Ltd. |
| Seven Star | High quality | Hokuetsu Paper Mfg. Co., Ltd. |
| Hakubotan | Medium quality | Honshu Paper Mfg. Co., Ltd. |
| Toyo Filter paper No. 4 | non-sized paper | Toyo Roshi Co., Ltd. |

TABLE 2a

| Example No. | Dye | Total conc. of divalent and higher valent metals in ink |
| --- | --- | --- |
| 2a | Water yellow 6 | 19 ppm |
| 3a | Chugonol Fast Red 3B | 20 ppm |
| 4a | Kayarus Turqoise Blue GL | 17 ppm |
| 5a | Special Black 7984 | 20 ppm |

TABLE 2b

| Example No. | Dye | Mg content in ink |
| --- | --- | --- |
| 2b | Water Yellow 6 | 3.9 ppm |
| 3b | Chugonol Fast Red 3B | 2.1 ppm |
| 4b | Kayarus Turqoise Blue GL | 3.5 ppm |
| 5b | Special Black 7984 | 2.9 ppm |

What is claimed is:

1. A liquid composition, comprising: from about 0.1–20% by weight of water-soluble dye and from about 80–99.9% by weight of a solvent, wherein said liquid composition has a total concentration of divalent and higher valent metals selected from the group consisting of calcium, magnesium, manganese, iron, aluminum, silicon and compounds thereof of 20 ppm or less.

2. The liquid compositions of claim 1, wherein the solvent is water.

3. The liquid composition of claim 1, wherein the solvent is a mixture of water and a water-soluble organic solvent.

4. The liquid composition of claim 2, wherein the water is distilled water and/or water deionized by ion exchange.

5. The recording liquid composition of claim 3, wherein the water is distilled water and/or water deionized by ion exchange.

6. The recording liquid of claim 1, wherein the divalent and higher valent metals are magnesium and compounds thereof.

7. A liquid composition, comprising: from about 0.1–20% by weight of a water-soluble dye and from about 80–99.9% by weight of a solvent, wherein said liquid composition has a magnesium concentration of 4 ppm or less.

8. The recording liquid of claim 7, wherein the solvent is water.

9. The recording liquid of claim 7, wherein the solvent is a mixture of water and a water-soluble organic solvent.

10. The recording liquid of claim 7, wherein the water is distilled water and/or water deionized by ion exchange.

11. The recording liquid of claim 8, wherein the water is distilled water and/or water deionized by ion exchange.

12. An ink-jet recording method, comprising: forming droplets of ink to perform recording, wherein the ink comprises a liquid composition containing from about 0.1–20% by weight of a water-soluble dye and from about 80–99.9% by weight of a solvent, wherein said liquid composition has a total concentration of divalent and higher valent metals selected from the group consisting of calcium, magnesium, manganese, iron, aluminum, silicon and compounds thereof of 20 ppm or less.

13. The ink-jet recording method of claim 12, wherein the solvent is water.

14. The ink-jet recording method of claim 12, wherein the solvent is a mixture of water and a water-soluble organic solvent.

15. The ink-jet recording method of claim 13, wherein the water is distilled water and/or water deionized by ion exchange.

16. The ink-jet recording method of claim 14, wherein the water is distilled water and/or water deionized by ion exchange.

17. The ink-jet recording method of claim 12, wherein the divalent and higher valent metals are magnesium and compounds thereof.

18. The ink-jet recording method of claim 12, wherein the droplets of the ink are formed by exerting thermal energy on the ink.

19. An ink-jet recording method, comprising: forming droplets of ink to perform recording, wherein the ink comprises a liquid composition containing from about 0.1–20% by weight of a water-soluble dye and from about 80–99.9% by weight of a solvent, wherein said liquid composition has a total concentration of magnesium of 4 ppm or less.

20. The ink-jet recording method of claim 19, wherein the solvent is water.

21. The ink-jet recording method of claim 19, wherein the solvent is a mixture of water and a water-soluble organic solvent.

22. The ink-jet recording method of claim 17, wherein the water is distilled water and/or water deionized by ion exchange.

23. The ink-jet recording method of claim 18, wherein the water is distilled water and/or water deionized by ion exchange.

24. The ink-jet recording method of claim 19, wherein the droplets of the ink are formed by exerting thermal energy on the ink.

* * * * *

UNITED STATES PATENT AND TRADEMARK OFFICE
CERTIFICATE OF CORRECTION

PATENT NO. : 4,732,613
DATED : March 22, 1988
INVENTOR(S) : MAKOTO SHIOYA, ET AL.

Page 1 of 2

It is certified that error appears in the above-identified patent and that said Letters Patent is hereby corrected as shown below:

COLUMN 1

Line 6, "a" (second occurrence) should be deleted.
Line 7, "record" should read --recording--.
Line 33, "heads" should read --heads.--.
Line 34, "art:" should read --art--.
Line 35, "on" should read --of--.
Line 38, "recorced" should read --recorded--.
Line 45, "inkjet" should read --ink-jet--.
Line 45, "has" should read --have--.

COLUMN 2

Line 52, "particulary" should read --particularly--.

COLUMN 3

Line 1, "watersoluble" should read --water-soluble--.
Line 3, "secbutanol," should read --sec-butanol,--.

COLUMN 4

Line 19, "percipitated" should read --precipitated--.

COLUMN 6

Line 37, "uniformely" should read --uniformly--.

COLUMN 7

Line 61, "dyes" should read --dye--.

UNITED STATES PATENT AND TRADEMARK OFFICE
CERTIFICATE OF CORRECTION

PATENT NO. : 4,732,613
DATED : March 22, 1988
INVENTOR(S) : MAKOTO SHIOYA, ET AL.

It is certified that error appears in the above-identified patent and that said Letters Patent is hereby corrected as shown below:

COLUMN 8

Line 19, "and and" should read --and--.
Line 39, "blight" should read --bright--.
Line 54, "washed a" should read --washed with a--.

COLUMN 9

Line 8, "dye one" should read --dye, one--.
Line 9, "othre" should read --other--.
Line 15, "the" should be deleted.
Line 16, "ink" should read --inks--.
Line 37, "Turqoise" should read --Turquoise--.
Line 46, "Turqoise" should read --Turquoise--.
Line 58, "compositions" should read --composition--.

Signed and Sealed this

Twentieth Day of September, 1988

Attest:

DONALD J. QUIGG

*Attesting Officer*      *Commissioner of Patents and Trademarks*